Nov. 7, 1939.　　　　J. McMULLEN　　　　2,178,693
AUTOMOBILE SECURING DEVICE
Filed May 26, 1936　　　3 Sheets-Sheet 1
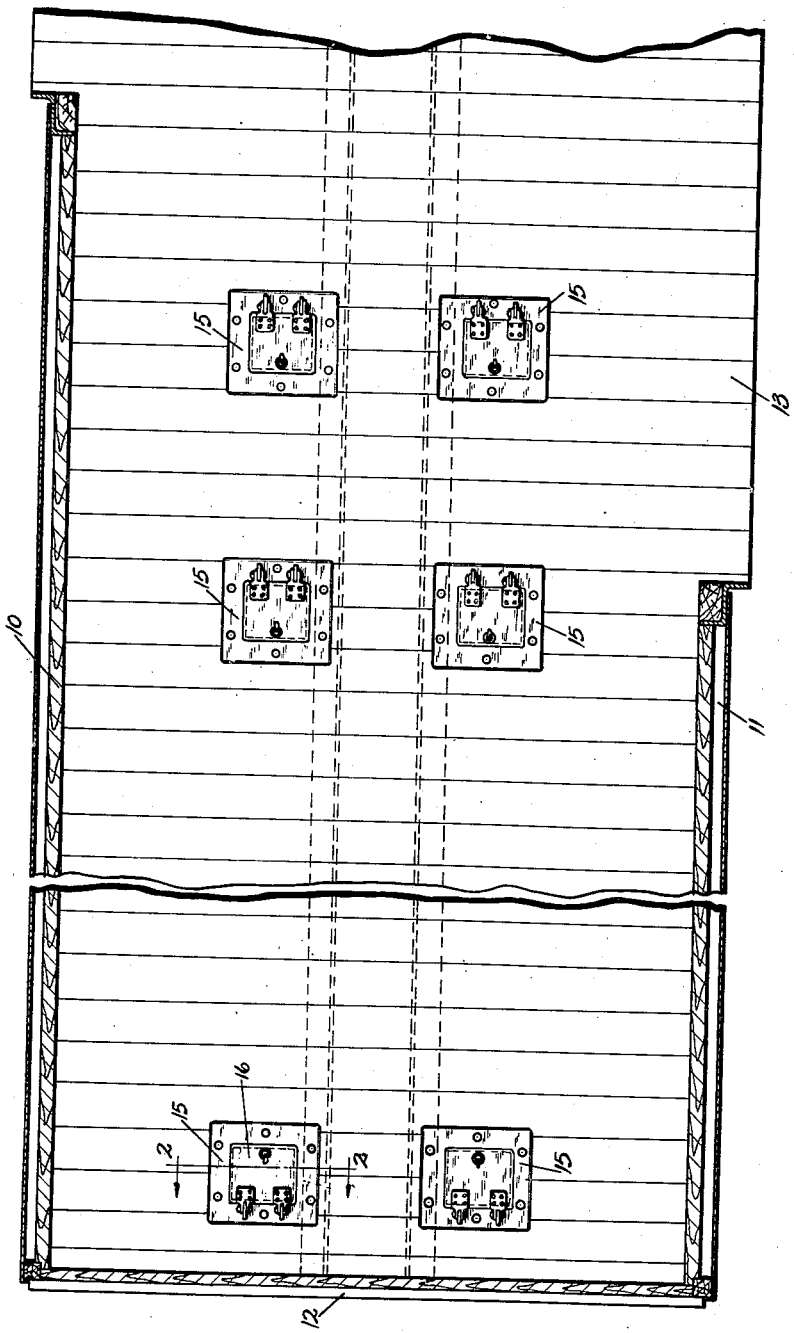
~INVENTOR~
JOHN McMULLEN
By~ Samuel Reese
ATTY.

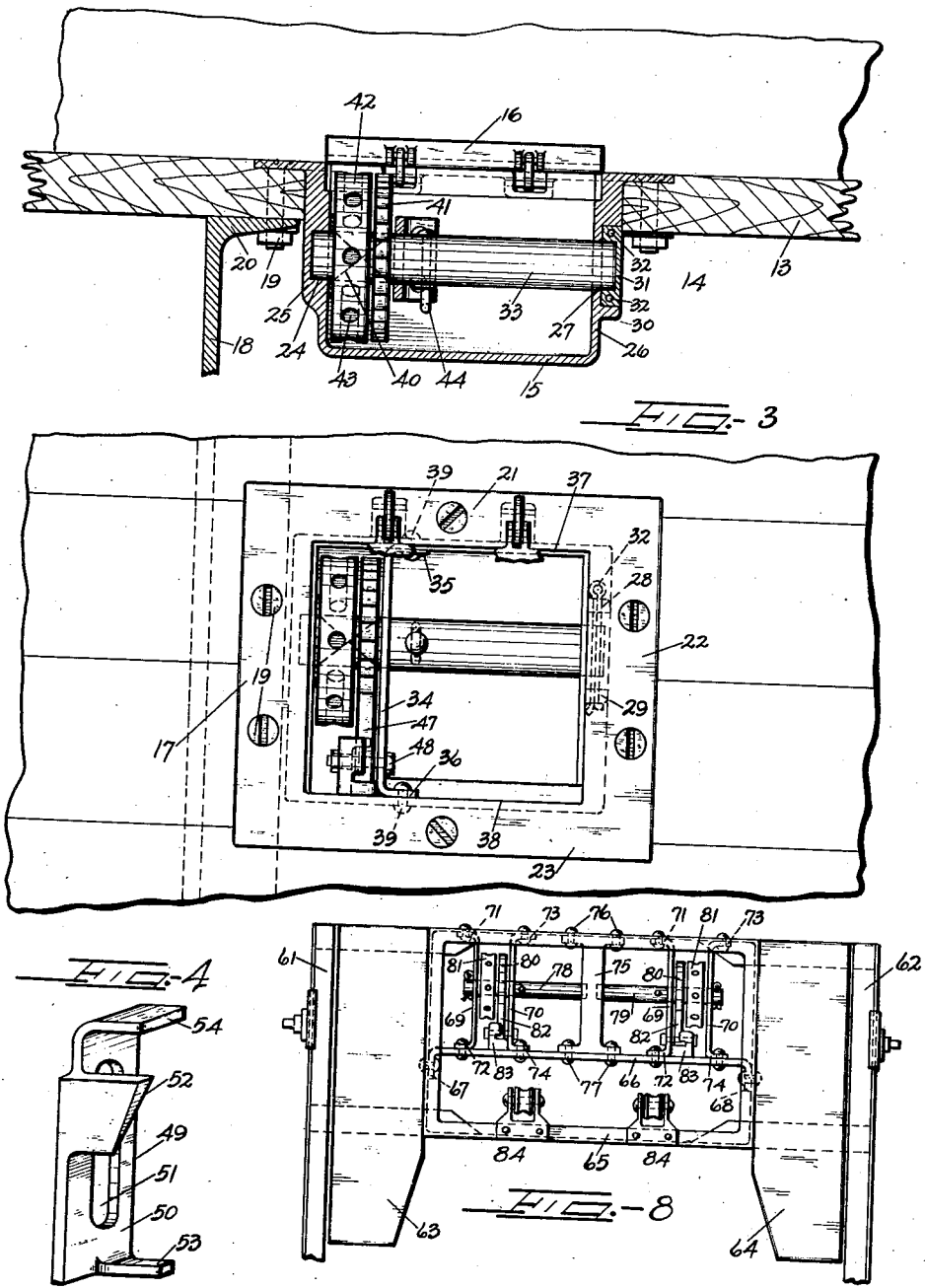

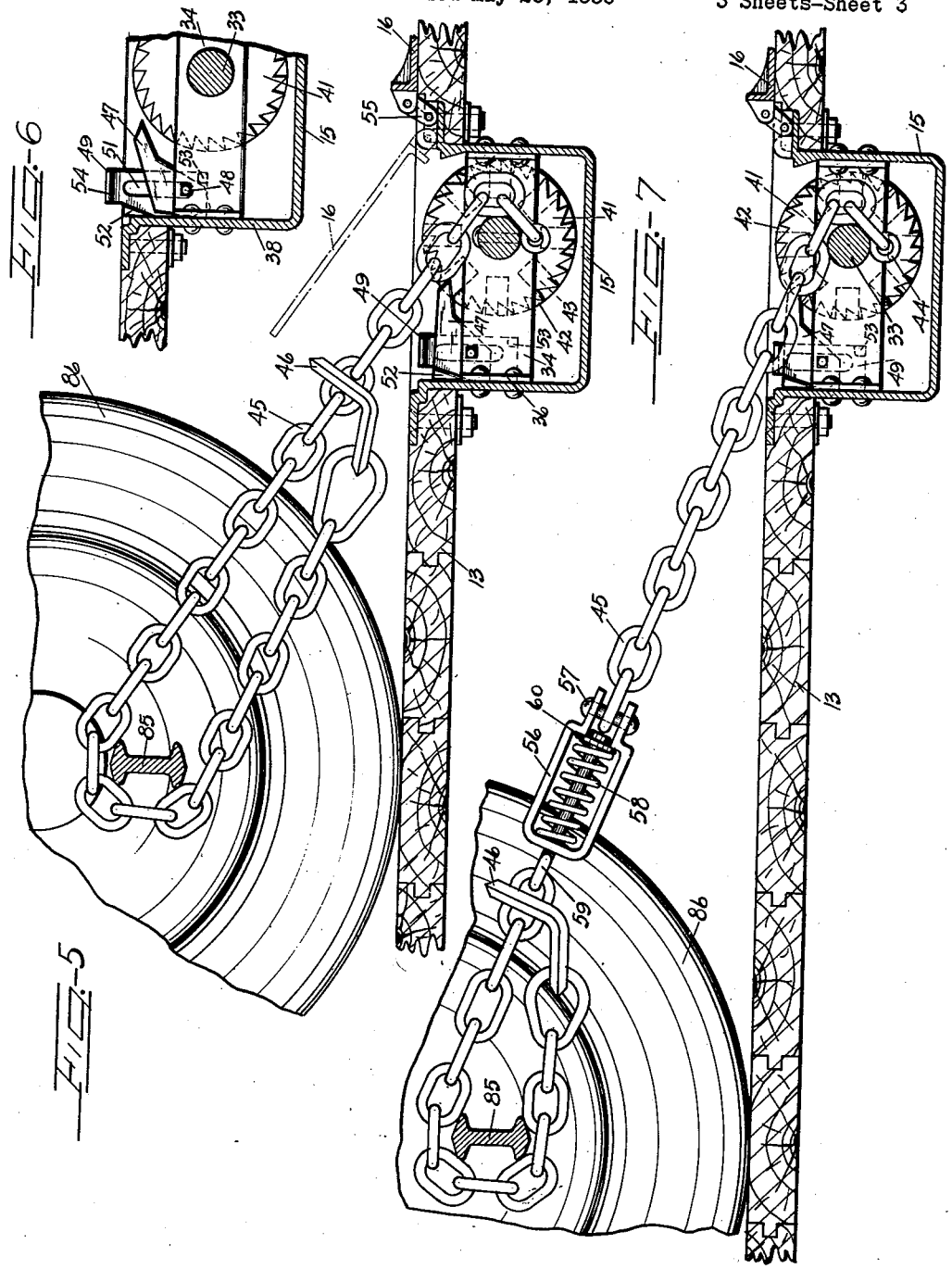

Patented Nov. 7, 1939

2,178,693

UNITED STATES PATENT OFFICE 2,178,693

AUTOMOBILE SECURING DEVICE

John McMullen, Buffalo, N. Y.

Application May 26, 1936, Serial No. 81,885

7 Claims. (Cl. 105—368)

This invention relates to devices for securing automobiles, trailers and other wheeled vehicles in railway freight cars and the like for transportation therein and concerns itself primarily with such devices adapted to be permanently incorporated in the cars and having means for positively, effectively and simply taking up the slack in chain or other flexible automobile securing means.

In the shipment of automobiles in freight cars or the like, devices are utilized for securing the automobiles either upon the floor of the car or upon decking frames known as "auto loaders". In either case this securement is obtained by flexible members such as chains which embrace the axles of the automobiles. One end of the chain is attached to the car while the other end is adapted for selective engagement with the chain. To facilitate engagement of the chain with the axle of an automobile the chain is passed around the axle and its free end engaged upon itself so as to leave some slack in the chain. This slack is then taken up so as to provide firm securement of the automobile.

Turn buckles are commonly used to take up slack. This mode of adjustment of the chain has developed certain difficulties. Rigid inspection of the turn buckles whenever the devices are to be placed in service is required. The threads on the associated parts of the turn buckles must be greased to insure ease of operation. Distortion or breakage of the threads of the turn buckles occurs necessitating disassembly of the devices and re-threading of the parts of the turn buckle and reassembly. Breakage of bolts forming part of the turn buckles requires replacement of these parts. And, where the devices are used upon auto loaders, damage to these loaders has given rise to the need for repairs and replacement of the damaged parts.

This invention has, therefore, for its main object the provision of securing devices for automobiles and other wheeled vehicles which may be installed as permanent equipment in freight cars or the like and which will eliminate the objections noted hereinabove.

A further object is to provide securing devices which shall not encroach upon the loading space of freight cars when such cars are used for the shipment of commodities other than automobiles.

A further object is to provide securing devices embodying flexible engaging means wherein the devices may be provided as a unit and installed as such as permanent equipment of freight cars or the like.

A further object is to provide securing devices adapted to be secured to the center sills of freight cars so that stresses incident upon said devices may be transmitted to the center sills.

A further object is to provide securing devices which shall be sturdy, compact, simple in construction and in operation, readily available and embody flexible engaging means and means for taking up the slack in said flexible means so constructed as to obviate threaded members.

A further object is to provide securing devices embodying means for preventing accidental release of the slack take-up or adjusting means.

A further object is to provide securing devices having means for preventing accidental release of the slack adjusting means when in operative position and for effecting release of the slack adjusting means when moved to inoperative position.

A further object is to provide devices of the character indicated, incorporating metallic casings set into the floors of freight cars and terminating above the lower ends of the car center sills so as to be protected from damage.

Other objects of the invention will become clear as the description thereof proceeds.

In the drawings forming part of this specification—

Figure 1 is a partial horizontal section of a railway freight car showing the arrangement of securing devices embodying the instant invention in the floor of a car and in relationship to the car center sill.

Figure 2 is a sectional view taken on line 2—2 of Figure 1, the cover plate being illustrated in open position.

Figure 3 is a plan view of a securing device with the cover plate removed in order to expose the elements of the device.

Figure 4 is a perspective view of the pawl retaining and releasing member.

Figure 5 is a partial sectional view of a securing device in operative position showing the chain of said device embracing an axle of an automobile and taut, together with the association of the pawl retaining and releasing member with the pawl to prevent accidental release of the latter from the ratchet wheel.

Figure 6 is a partial sectional view of a securing device showing the relationship between the pawl retaining and releasing member and the pawl with the latter disengaged from the ratchet wheel by said member.

Figure 7 is a view similar to Figure 5 showing a spring cushioning means introduced into the chain, and Figure 8 is a detail view illustrating the application of a device embodying the instant invention to a decking frame or auto loader.

Referring to Figures 1 to 7 inclusive of the drawings the instant invention is illustrated in its application to a railway freight car of the house type and in association with an automobile. In Figure 1 of the drawings the preferred spacing of the devices in the floor of the freight car is shown, this spacing preferably being repeated for the other half of the car. In addition, Figure 1 clearly indicates the preferred relationship between the devices and the center sill of the car, indicated in dotted lines, whereby securement of the devices to the center sill is obtained in order that stresses incident upon the devices may be transmitted to the center sills. It is to be understood that the instant invention is not limited in its application to railway freight cars but may be used in any vehicle adapted for the transportation of automobiles, trailers or other wheeled vehicles. Moreover, the number and the spacing of the devices utilized may be varied to suit conditions. It is preferred, however, as indicated in Figure 1 of the drawings, that the devices be arranged in pairs alined transversely of the car.

The freight car illustrated is provided with side walls 10 and 11 and end walls, one of which is indicated at 12. The floor of the car is shown at 13 and is provided with the desired spaced openings 14 in order to receive the devices of the instant invention.

One such device is clearly illustrated in Figures 2, 3, 5, 6 and 7 of the drawings. The device embodies a metallic casing member 15, preferably in the form of a box provided with a hinged cover member 16. As illustrated, the box is substantially rectangular in plan and is formed with flanges extending from its sides. The flange 17 is secured to the center sill 18 by means of a plurality of bolts 19 passing through the floor 13 of the car and a flange 20 of the center sill. These bolts 19, in addition to their function of securing the casing 15 to the center sill, operate to secure the floor to the center sill. The remaining flanges 21, 22 and 23 of the casing are also bolted to the floor 13, as indicated in Figure 3 of the drawings.

Within the side of the casing adjacent to the center sill and in the side opposite therefrom bearings are provided. The bearing 24 is formed within the side 25 of the casing. The side 26 of the casing is provided with an opening 27. Vertical flanges 28 and 29 and a horizontal flange 30 extend from the side 26 adjacent to the opening 27. These vertical and horizontal flanges define a recess within the side 26 in which a bearing 31 is disposed. This bearing is fastened within the recess as by means of cotter pins 32, thereby releasably securing the bearing within the recess.

Within the bearings hereinabove described the ends of a shaft 33 are adapted to be journaled. Intermediate its ends the shaft 33 passes through a member 34, the ends of which are flanged, as indicated at 35 and 36, and fastened to the sides 37 and 38 of the casing as by means of rivets 39. The portion of the shaft lying between the member 34 and the end thereof journaled in the side 25 is squared, as indicated at 40, and upon this squared portion of the shaft 33 there is mounted a ratchet wheel 41 and an actuating disk 42. The ratchet wheel and the disk are provided with squared openings within which the squared portion of the shaft extends so that the shaft and the ratchet wheel and actuating disk rotate together. The actuating disk 42 is formed with a plurality of holes 43 adapted to receive the shank of a bolt or bar in order to rotate the disk. Eight such holes are illustrated in the actuating disk.

An eye bolt 44 extends through the shaft. A chain 45 has one end secured to the eye bolt 44. The opposite end of the chain is provided with a hook 46 into which a link of the chain may be placed.

A pawl 47 is pivotally mounted upon the casing 15 in position to cooperate with the ratchet wheel. The pivotal mounting for the pawl is provided by means of a bolt 48 which extends through the member 34. The free end of the pawl is adapted to cooperate with the toothed periphery of the ratchet wheel in order to prevent rotation of the shaft upon which the ratchet wheel is mounted in the direction of unwinding of the chain.

Upon the bolt 48 there is mounted a pawl retaining and releasing member 49. This member is provided with a body portion 50 in which an elongated slot 51 is formed. The bolt 48 extends through the slot 51 thereby mounting the pawl retaining and releasing member in one position. A wedge member 52 extends from one side of the body portion 50. A flange 53 extends from the body portion below the wedge member 52 and a flange 54 extends from the body portion above the wedge member 52. The flanges 53 and 54 extend in the same direction as the wedge member 52 from the body portion of the member. As best illustrated in Figures 5 and 6 of the drawings, the retaining and releasing member 49 is associated with the pawl 47 so that the wedge member 52 thereof may be disposed between the side 38 of the casing 15 and the rear of the pawl. The association between the pawl and the retaining and releasing member 49 is such that the lower flange 53 is disposed below the pawl while the upper flange 54 of said member is disposed above the pawl. The cover member 16 of the casing is preferably fastened to the casing by means of a multiple pintle hinge 55 so that when in open position the cover member will lie flat upon the floor. The casing and its cover member are so disposed relative to the floor of the car that the device will not project above the floor.

A modified embodiment of the invention is illustrated in Figure 7 of the drawings. In this embodiment a spring device is introduced into the chain so as to provide a cushioning means capable of absorbing shocks which might otherwise be transmitted to the automobile. The spring device comprises essentially a frame member 56 to one end of which a chain 45 is secured as by means of a rivet 57 passing through one link of the chain and the corresponding end of the frame member 56. Within this frame member a helical spring 58 is placed, one end of the spring abutting against the opposite end of the frame member 56. An eye bolt 59 extends through the spring 58 and is fastened to the chain 45. The spring 58 is secured between the end of the frame member against which it abuts and an end of the eye bolt 59, the opposite end of the spring abutting against a washer 60 carried by the eye bolt 59.

The device of the instant invention is capable of assembly and use with an automobile decking device or "auto loader". One arrangement of the device embodying the instant invention with an auto loader is illustrated in Figure 8 of the drawings, it being understood that a similar arrangement will be applied to the opposite end of the auto loader. The auto loader illustrated embodies side frame members 61 and 62 adjacent to which wheel supporting members 63 and 64 are disposed. The automobile securing device of the instant invention is positioned between the automobile wheel supporting members 63 and 64 and to this end a substantially rectangular metallic frame 65 is secured to the auto loader. A bar 66 extending transversely of the loader is flanged at its ends as indicated at 67 and 68 and secured to the frame 65. Between this bar and the outer side of the frame 65 a plurality of reinforcing and bearing members are secured. Reinforcing members 69 and 70 are arranged in pairs, the ends of each of these members being flanged, as indicated at 71 and 72 and 73 and 74, these flanges being secured as by means of rivets to the bar 66 and the outer side of the frame 65. An additional reinforcing and bearing member 75, substantially I-shaped in section, is disposed between the pairs of bearing members 69 and 70, the flanges of this member being riveted to the bar 66 and the outer side of the frame 65, as indicated at 76 and 77.

In the form illustrated two separate shafts are utilized. The shaft 78, to which a chain such as 45 is adapted to be secured, is journaled in the left-hand pair of members 69 and 70 and in the member 75. Similarly, the shaft 79, to which a chain such as 45 is adapted to be secured, is journaled in the member 75 and in the right-hand pair of members 69 and 70. Between each pair of members 69 and 70 and fastened to the respective shaft is disposed a ratchet wheel 80 and an actuating disk 81. A pawl 82 and a pawl retaining and releasing member 83 is associated with each ratchet wheel.

A pair of shives 84 are mounted upon the inner side of the frame 65. The axis of rotation of these shives lies parallel to the axis of rotation of each of the shafts 78 and 79. The shives 84 are provided so that when desired the chains adapted to be secured to the shafts may engage the axle of an automobile in either of two directions. It is to be observed, moreover, that the arrangement of the devices with the auto loader is such as not to interfere with the position of the auto loader upon the floor of a car at which time it is adapted to receive an automobile. Moreover, the disposition of the devices of the instant invention upon the auto loader is such as to avoid interference between these devices and the axles of an automobile.

Reference to Figures 2, 3, 5 and 6 of the drawings will make the operation of the automobile securing devices clear. In Figure 5 of the drawings the device is shown in its operative engagement with an automobile. The chain 45 of the device embraces an axle 85 of an automobile, the wheel 86 of which is illustrated as resting upon the floor of a transportation vehicle. This relationship between the chain 45 and an axle of an automobile will of course occur when the device is utilized with an auto loader. In the association between the securing device and the automobile, as illustrated in Figure 5 of the drawings, the hook 46 of the chain has been engaged with a link of the chain and the actuating disk has been operated so as to wind the chain upon the shaft 33 thereby taking up any slack which might have resided in the chain and securely fastening the automobile in position. This fastening, of course, occurs in association with a similar fastening of the other axle of the automobile so that movement of the automobile in the direction of its length is obviated. It will be understood, moreover, that two chains will engage each axle, this engagement being symmetrical with the axis of the automobile.

Referring again to Figure 5 of the drawings, the chain is maintained in its taut condition by means of the cooperating ratchet wheel and pawl. It will be apparent that as long as the pawl is maintained in association with the ratchet wheel as illustrated it will be impossible for any slack to develop in the chain. This association between the pawl and its ratchet wheel is insured by means of the retaining and releasing member.

In the operative position of the pawl it will be seen from Figure 5 of the drawings that the rear of the pawl is inclined at an angle to the side 38 of the casing. Within this angle the wedge member 52 is disposed whereby the straight face of said member engages the side 38 of the facing and the inclined face of said member engages the rear of the pawl. When so associated with the casing and the pawl the retaining and releasing member 49 will prevent accidental release of the pawl from the ratchet wheel. However, when it is desired to remove the chain from the axle of the automobile the upper flange 54 of the retaining and releasing member which serves as a finger grip is grasped and said member raised. In the raising movement thereof the lower flange 53 will engage the pawl 47 and, hence, effect release of the pawl from the ratchet wheel. Thereupon sufficient slackness in the chain will be obtained so as to readily permit release of the hook 46 from the chain and disengagement of the chain from the axle 85. When the automobile has been removed from the car the fastening chain 45 may be stored within the casing and, together with the remaining parts of the device, protected by means of the cover 16. The arrangement of the cover relative to the casing is such that in its closed position it will not project above the floor.

It will be apparent that numerous changes and modifications in the details of the invention will be clear to those skilled in the art. It is intended, therefore, that all such modifications and changes be comprehended within this invention, which is to be limited only by the scope of the claims appended hereto.

I claim:—

1. In an automobile transportation vehicle a casing adapted to extend below an opening in the floor of said vehicle, a shaft journaled in said casing, an actuating disk, a ratchet wheel, said disk and wheel being mounted upon said shaft for rotation therewith within said casing, a flexible fastening member attached to said shaft, a pawl pivotally mounted within said casing for cooperation with said ratchet wheel, and means including a wedge member mounted in said casing for relative movement with respect to said pawl, said wedge member being adapted to be disposed in wedging engagement between said pawl and said casing to prevent release of said pawl from said ratchet wheel.

2. In an automobile transportation vehicle a casing adapted to extend below an opening in the floor of said vehicle, a shaft journaled in said casing, an actuating disk, a ratchet wheel, said disk and wheel being mounted upon said shaft for rotation therewith within said casing, a flexible fastening member attached to said shaft, a pawl pivotally mounted within said casing for cooperation with said ratchet wheel and means mounted within said casing including a wedge member and a flange mounted for movement relative to said pawl, said wedge member in one position of said means being disposed between said pawl and said casing to prevent release of said pawl from said ratchet wheel, said flange being engageable with said pawl upon disengagement of said wedge member from said pawl to effect release of the latter from said ratchet wheel.

3. As an article of manufacture, a pawl engaging member for an automobile securing device which includes a casing and a ratchet wheel and pawl in said casing, said pawl engaging member being mounted in said casing and having a wedge adapted to be slidably disposed between and engage said casing member and said pawl to prevent disengagement of said pawl from said ratchet wheel.

4. As an article of manufacture, a pawl engaging member for an automobile securing device which includes a casing and a ratchet wheel and pawl in said casing, said pawl engaging member being mounted in said casing and having a body portion, a wedge carried by said body portion and a flange, said wedge being adapted to be slidably disposed between and engage said casing and said pawl to prevent disengagement of said pawl from said ratchet wheel, said flange underlying said pawl and being adapted to engage and release said pawl from said ratchet wheel when said wedge is removed from between said casing and said pawl.

5. The combination with means for supporting an automobile for shipment of, a casing carried by said means, a shaft journalled in said casing, a shaft actuating member secured upon said shaft within said casing, a ratchet wheel mounted upon said shaft for rotation therewith within said casing, a flexible automobile fastening member attached to said shaft, a pawl pivotally mounted within said casing for cooperation with said ratchet wheel and means including a wedge member mounted in said casing for relative movement with respect to said pawl, said wedge member being adapted to be disposed in wedging engagement between said pawl and said casing to prevent release of said pawl from said ratchet wheel.

6. As an article of manufacture an automobile securing device adapted to constitute a part of the permanent equipment of a freight car or the like comprising, a frame, a shaft journalled in said frame, means fastened upon said shaft in said frame for imparting rotation to said shaft, a ratchet wheel in said frame rotatable with said shaft, a flexible fastening member secured to said shaft and adapted to be wound thereon, a pivotally mounted pawl in said frame cooperable with said ratchet wheel to prevent unwinding of said fastening member and means in said frame including a wedge member adapted to be disposed in wedging engagement between said pawl and said frame to prevent release of said pawl from said ratchet wheel, said article of manufacture being adapted for securement as a unit to a structure capable of supporting an automobile for shipment for fastening said automobile to said structure.

7. As an article of manufacture an automobile securing device adapted to constitute a part of the permanent equipment of a freight car or the like comprising, a frame, a shaft journalled in said frame, means fastened upon said shaft in said frame for imparting rotation to said shaft, a ratchet wheel in said frame rotatable with said shaft, a flexible fastening member secured to said shaft and adapted to be wound thereon, a pivotally mounted pawl in said frame cooperable with said ratchet wheel to prevent unwinding of said fastening member and means in said frame including a wedge member and a flange, said wedge member being disposed between said frame and said pawl to prevent release of said pawl from said ratchet wheel, said flange being engageable with said pawl upon disengagement of said wedge member from said pawl to effect release of the latter from said ratchet wheel, said article of manufacture being adapted for securement as a unit to a structure capable of supporting an automobile for shipment for fastening said automobile to said structure.

JOHN McMULLEN.